United States Patent
Prutu

(10) Patent No.: US 6,690,995 B2
(45) Date of Patent: Feb. 10, 2004

(54) METHOD AND APPARATUS FOR MEASURING AND DIVERTING AN OBJECT FROM A HIGH-SPEED CONVEYOR

(75) Inventor: Victor Nicholas Prutu, Duluth, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 0 days.

(21) Appl. No.: 10/226,376

(22) Filed: Aug. 22, 2002

(65) Prior Publication Data

US 2003/0075416 A1 Apr. 24, 2003

Related U.S. Application Data

(60) Provisional application No. 60/314,770, filed on Aug. 24, 2001.

(51) Int. Cl.$^7$ .................................................. G06F 7/00
(52) U.S. Cl. ...................... 700/228; 198/597; 198/598; 198/572; 700/213; 700/230
(58) Field of Search .......................... 198/459.1, 460.1, 198/570, 571, 572, 597, 598; 700/228, 213, 230

(56) References Cited

U.S. PATENT DOCUMENTS

| | | | |
|---|---|---|---|
| 3,198,513 A | | 8/1965 | Farez |
| 3,242,342 A | | 3/1966 | Gabar |
| 3,435,667 A | | 4/1969 | Browning et al. |
| 3,485,339 A | | 12/1969 | Miller et al. |
| 3,513,444 A | | 5/1970 | Henderson et al. |
| 3,515,254 A | | 6/1970 | Gary |
| 4,150,743 A | * | 4/1979 | Lazzarotti et al. |
| 4,200,178 A | | 4/1980 | Gunti |
| 4,419,384 A | | 12/1983 | Kane et al. |
| 4,514,963 A | * | 5/1985 | Bruno |
| 4,604,704 A | | 8/1986 | Eaves et al. |
| 4,967,857 A | | 11/1990 | Kent et al. |
| 5,301,544 A | | 4/1994 | Smith |
| 5,340,950 A | | 8/1994 | Brandorff et al. |
| 5,408,054 A | | 4/1995 | Brandorff et al. |
| 5,672,815 A | | 9/1997 | Prutu |
| 5,868,238 A | | 2/1999 | Bonnet |
| 5,967,290 A | | 10/1999 | Bonnet |
| 6,259,967 B1 | * | 7/2001 | Hartlepp et al. |
| 6,264,042 B1 | * | 7/2001 | Cossey, Jr. et al. |

FOREIGN PATENT DOCUMENTS

| | | |
|---|---|---|
| DE | 25 03 991 | 8/1976 |
| DE | 40 27 274 A1 | 3/1992 |
| DE | 295 19 805 U1 | 12/1995 |
| EP | 0415771 A2 | 3/1991 |
| EP | 0 818 406 A1 | 1/1998 |
| FR | 2 576 528 A1 | 8/1986 |
| FR | 2 581 375 | 11/1986 |
| JP | 57-132010 | 8/1982 |
| JP | 57-157133 | 9/1982 |
| JP | 58-195112 | 11/1983 |
| JP | 61-181908 | 8/1986 |
| JP | 63-290933 | 11/1988 |
| RU | 615373 | 1/1976 |
| WO | WO 88/06720 | 9/1988 |

* cited by examiner

*Primary Examiner*—Khoi H. Tran
(74) *Attorney, Agent, or Firm*—Alston & Bird LLP

(57) ABSTRACT

A method and apparatus for measuring and sorting parcels, including the concept of determining at least one component of the gravity center of said parcels. Determination of the gravity center component includes the use of a tilting action in combination with the use of sensors to sense the movement of the parcels as they tilt. Another concept includes the use of sensors to determine whether a parcel is sufficiently rigid to provide a tilting action, or whether the parcel is flexible and thus does not provide a tilting action so much as it provides a flexing action over the pivot point.

23 Claims, 8 Drawing Sheets

METHOD AND APPARATUS FOR MEASURING AND DIVERTING AN OBJECT FROM A HIGH-SPEED CONVEYOR

CROSS REFERENCE TO RELATED APPLICATION

This application claims the full benefit and priority of provisional U.S. Patent Application Serial No. 60/314,770, filed Aug. 24, 2001, entitled "Method and Apparatus for Measuring and Diverting an object from a High-Speed Conveyor", inventor Victor Nicholas Prutu, and incorporates the entire contents of said application herein.

TECHNICAL FIELD

The present invention relates generally to the field of conveying and sorting and, more particularly, to a method and apparatus for measuring the center of gravity of a package on a moving conveyor and then pushing said package proximate its center of gravity to divert it from the conveyor without inducing a significant rotation.

BACKGROUND OF THE INVENTION

Modern parcel delivery services typically rely upon automated sorting systems to quickly and accurately sort packages into defined groups for distribution and delivery. The demand for faster sorting is one of the driving forces behind current innovations in the field of automated parcel sorting. As sorting systems are required to process more and more packages per hour, the devices for conveying, sorting, and diverting packages are becoming more sophisticated.

The demand for high-speed sorting has also sparked a need for sorting systems that are capable of handling a wide variety of packages having different sizes, shapes, and weights. Generally, an automated sorting system that does not require pre-sorting of packages by hand into like-size groups, for example, can proceed to final sort much quicker and with less cost.

High-speed conveying and sorting of large numbers of packages presents a variety of technical challenges, especially when the size, shape, and weight of the packages vary widely. The orderly diverting of packages of different weights, for example, requires a diverter capable of gently exerting a force that is proportional to the measured weight of the package. Similarly, the orderly diverting of packages of different sizes and shapes requires a method and apparatus for determining the optimal pushing location on each package, according to its particular size and shape, and a system to control the motion of the diverter at the appropriate time.

In a high-speed sorting system, it is advantageous to divert objects without causing them to topple, turn, or start spinning. Conveyors and other devices downstream work more efficiently when the entering objects are stable and proceed in an orderly manner. A rotating package can jam downstream devices, interfere with stacking operations, or slide off the side of a conveyor, for example. Delays and system shutdowns caused by a spinning package are expensive and may interfere with sequential processing.

The orderly diverting of selected packages from among a diverse group of sizes and shapes is further complicated by the presence of soft, flexible pouches. The flexible pouch typically has dimensions that are difficult to measure, edges that are difficult to define, and a host of other unique characteristics requiring special handling.

Thus, there remains a need in the art for a method and apparatus to sort and divert packages from a group of packages having widely diverse characteristics.

There is a further need for a method and apparatus to divert packages with improved accuracy.

There is a related need for a method and apparatus to calculate the approximate center of gravity of a package from measured characteristics.

There is also a need for a method and apparatus to sense and transmit data about an object to a controller configured to direct and control the movement of downstream sorting and diverting components.

SUMMARY OF THE INVENTION

The present invention overcomes deficiencies in the prior art by providing a method and apparatus for measuring and diverting objects from a moving conveyor based upon various measurements. Stated generally, the invention comprises an array of sensors to measure the object, a signal processor to calculate or assign the approximate center of gravity, a diverter, and an actuator in communication with the signal processor to move the diverter such that it pushes against the approximate center of gravity of the object.

More particularly described, the present invention provides a conveying apparatus for evaluating a plurality of parcels being conveyed thereon, the plurality of parcels having differing lengths, the plurality of parcels including a parcel, the apparatus comprising a first conveyor defining a first conveying surface and including an exit location, a first sensor configured for sensing the presence of a first parcel portion of the parcel while the parcel is on the conveying surface, the first sensor configured to provide a first sensor signal when the first parcel portion moves out of the sensing range of the first sensor due either to tilting of the parcel over the crest, or alternatively due to movement of the parcel along the first conveyor portion without tilting, the first sensor being a first distance from the exit location, a second sensor configured for sensing the presence of a second parcel portion of the parcel while the parcel is on the conveying surface, the second sensor configured to provide a second sensor signal when the second parcel portion moves out of the sensing range of the second sensor due to tilting of the parcel over the crest, or alternatively due either to movement of the parcel along the first conveyor portion without tilting, the second sensor being a second distance from the exit location, the second distance being less than the first distance, and a signal processing device for receiving the first and second signals and for determining for each of the parcels if one of two conditions is met:

1) a first condition in which the first and second sensor signals are generated within a predetermined time;
2) a second condition in which the first and second sensor signals are not generated within the predetermined time, the signal processing device providing a different output regarding parcel length depending on whether the first or second condition is met.

In another aspect of the invention, the inventive system is configured to actuate a diverter at a time when the cleats of the diverter will push against the approximate center of gravity of the object.

Therefore, it is an object of the present invention to provide an improved conveying system which provides improved sorting characteristics.

It is a further object of the present invention to provide an improved conveying method and apparatus which increases sorting capacity.

It is a further object of the present invention to provide an improved conveying method and apparatus, which recognizes differences in, parcel flexibility.

It is a further object of the present invention to provide an improved conveying method and apparatus, which recognizes differences in, parcel size, particularly length.

It is also an objective of the present invention to provide an improved method and apparatus that calculates or approximates the approximate center of gravity of an object based upon the measured characteristics.

It is a further object of the present invention to provide an improved conveying method and apparatus which diminishes rotation of the parcel during ejection of the parcel from the belt.

It is an further object of the present invention to provide an improved conveying and sorting system that diverts selected objects from a group of objects having widely diverse sizes and shapes.

It is further object of the present invention to provide a system for sensing and transmitting data about an object to a controller that is configured to direct and control the movement of downstream sorting and diverting components such that the diverting of various size objects may be accomplished without inducing unwanted rotation.

These and other objectives are accomplished by the method and apparatus disclosed and will become apparent from the following detailed description of a preferred embodiment in conjunction with the accompanying drawings in which like numerals designate like elements.

BRIEF DESCRIPTION OF THE DRAWINGS

Figure 1:
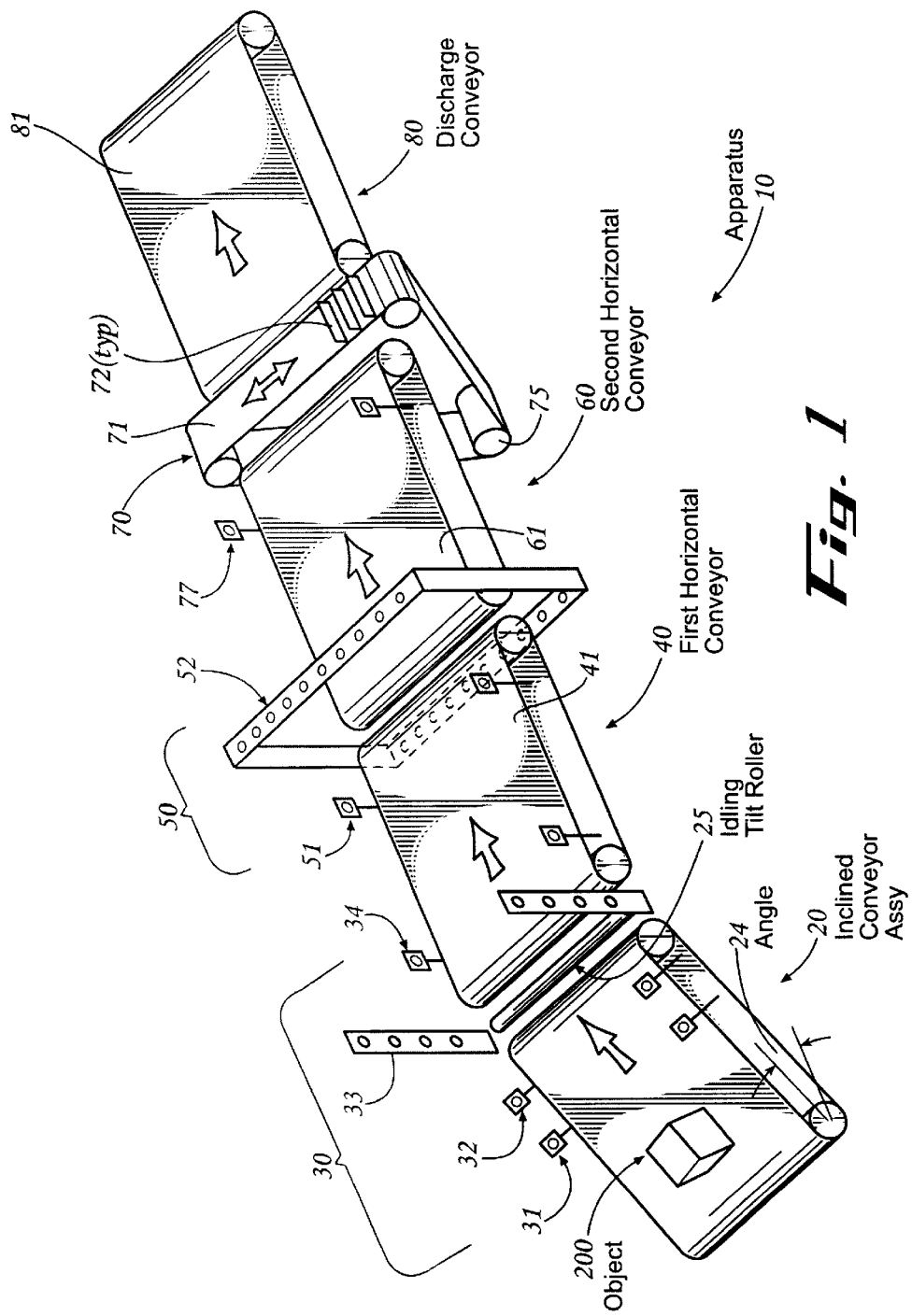

Having thus described the invention in general terms, reference will now be made to the accompanying drawings, which are not necessarily drawn to scale, and wherein like numerals indicate like elements throughout the several views:

FIG. 1 is a perspective view of the conveying and diverting system 10 of the present invention, with an exemplary item, parcel or package 200 shown thereon.

Figure 2:
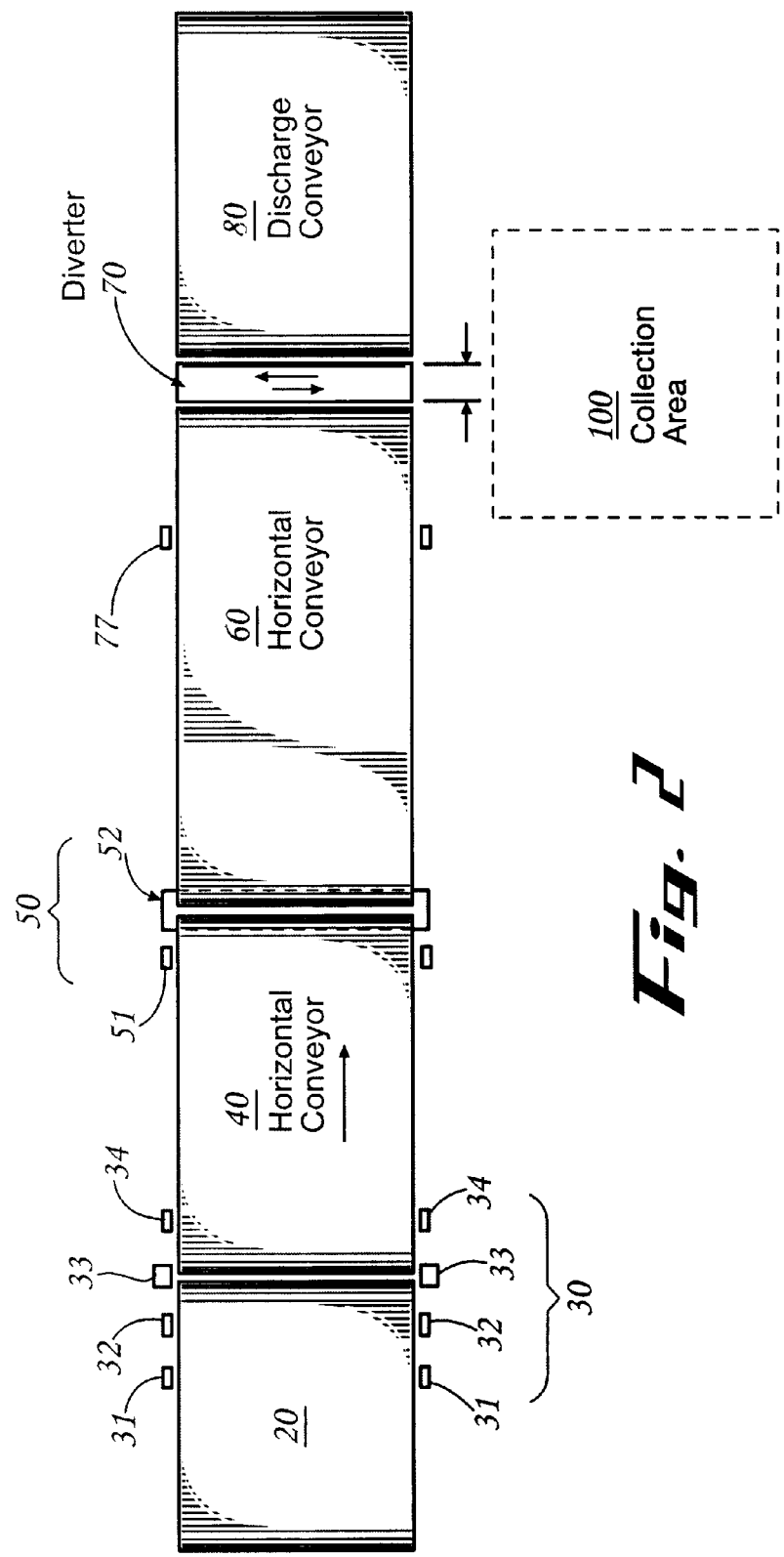

FIG. 2 is a top view of the diverting system 10 of the present invention. The item 200 of FIG. 1 is not shown.

Figure 3:
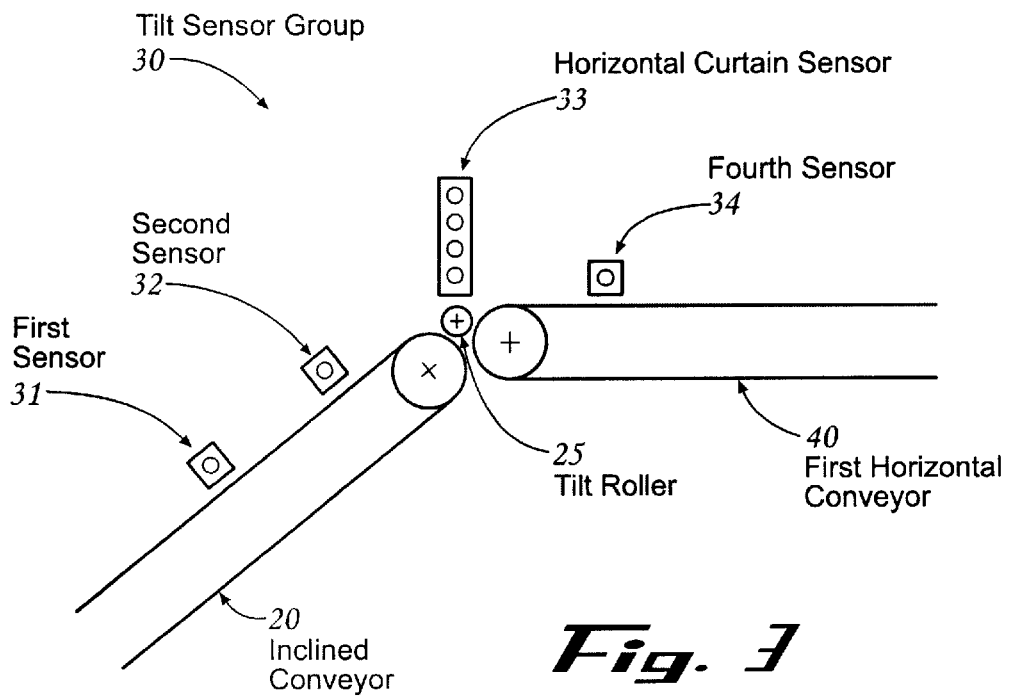

FIG. 3 is a side illustrative view of a portion of the apparatus which includes the tilt sensor group 30 and the tilt roller 25.

Figure 4:
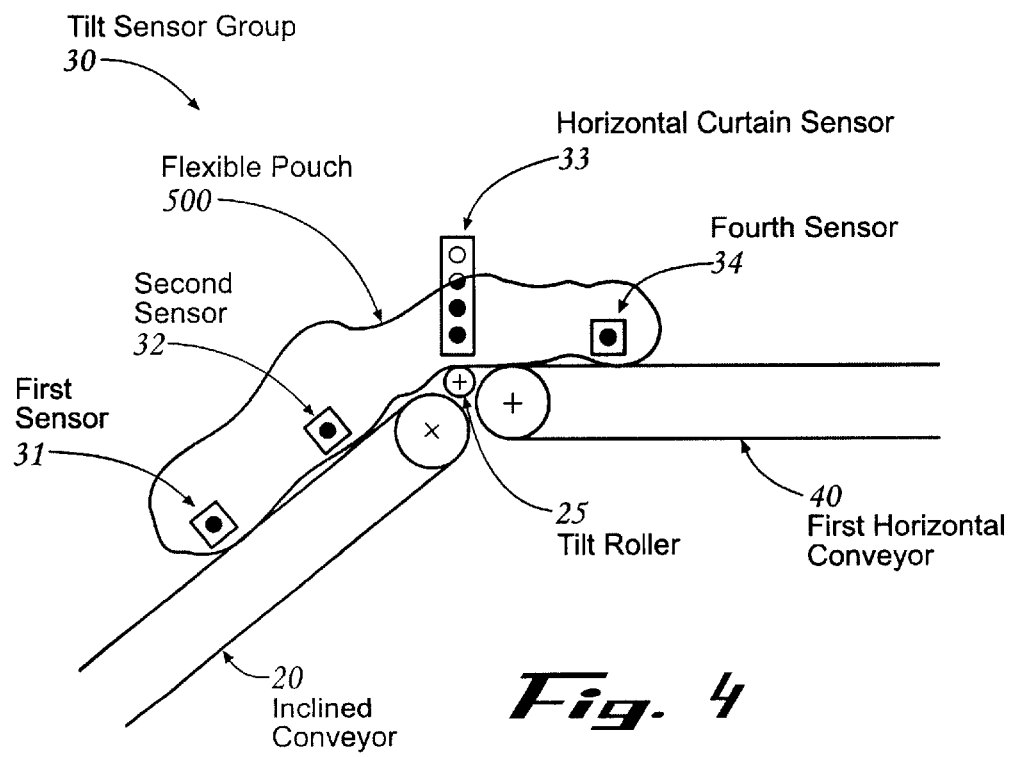

FIG. 4 is a view similar to FIG. 3, in which a "flexible" or "more flexible" item (a.k.a. "flexible pouch") 500 is passing by the tilt sensor group 30 of the present invention, thus obstructing (a.k.a. "covering" or "triggering") sensors 31, 32, 33, and 34. It should be understood that the flexibility of the item 500 allows the concurrent triggering of sensors 32 and 34, whereas a more rigid (a.k.a. "less flexible") parcel would not (it would tilt out of range of 31 before triggering 34).

Figure 5A:
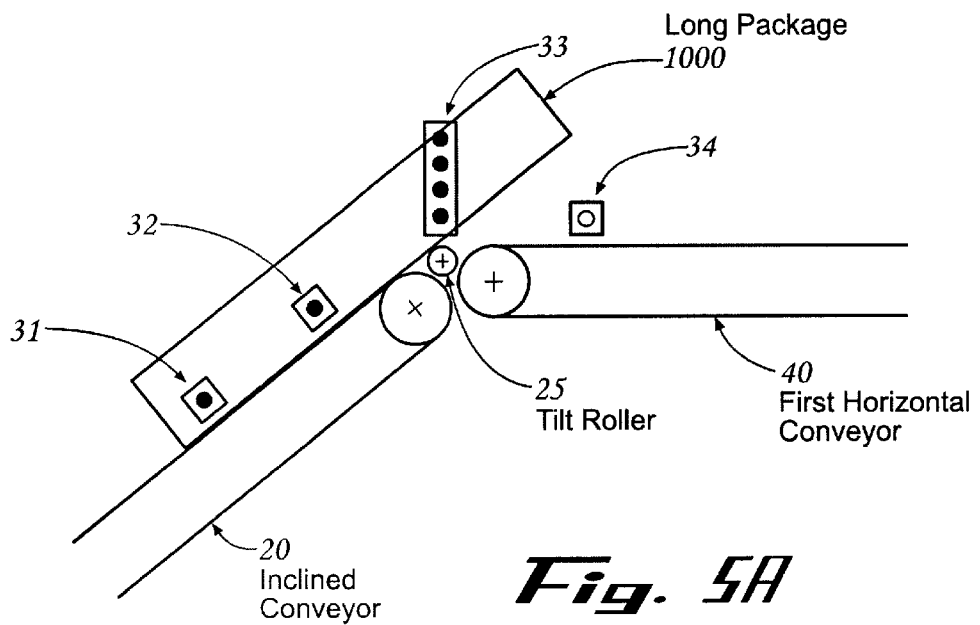

FIG. 5A is a view similar to FIG. 3, in which a "long" package 1000 is entering the tilt sensor group 30 and crossing the tilt roller 25 between the inclined conveyor 20 and the first horizontal conveyor 40. Sensors 31 and 32 are triggered, whereas sensor 34 is not.

Figure 5B:
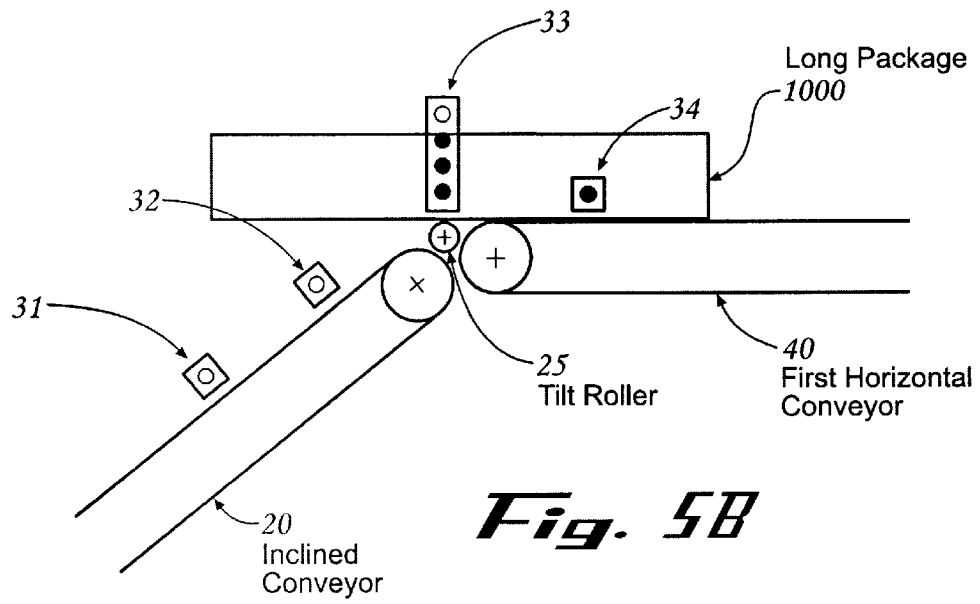

FIG. 5B is a view similar to FIG. 5A, in which the long package 1000 has tilted over the tilt roller and landed on the first horizontal conveyor 40. Sensor 34 is triggered, whereas sensors 31 and 32 now are not.

Figure 6A:
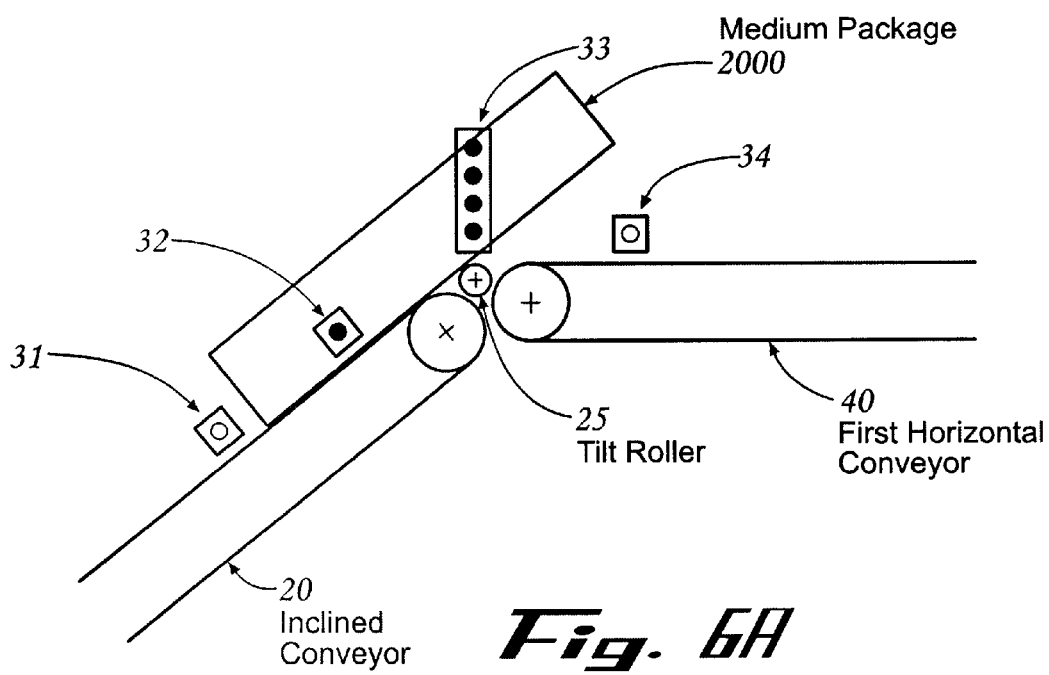

FIG. 6A is a view similar to FIG. 3, in which a "medium" length package 2000 has entered the tilt sensor group 30 and crossed the tilt roller 25 between the inclined conveyor 20 and the first horizontal conveyor 40. As may be seen, sensor 31 is uncovered although the package has not yet tilted (it has been conveyed out of range of 31). Sensor 32 is covered, whereas sensor 34 is not.

Figure 6B:
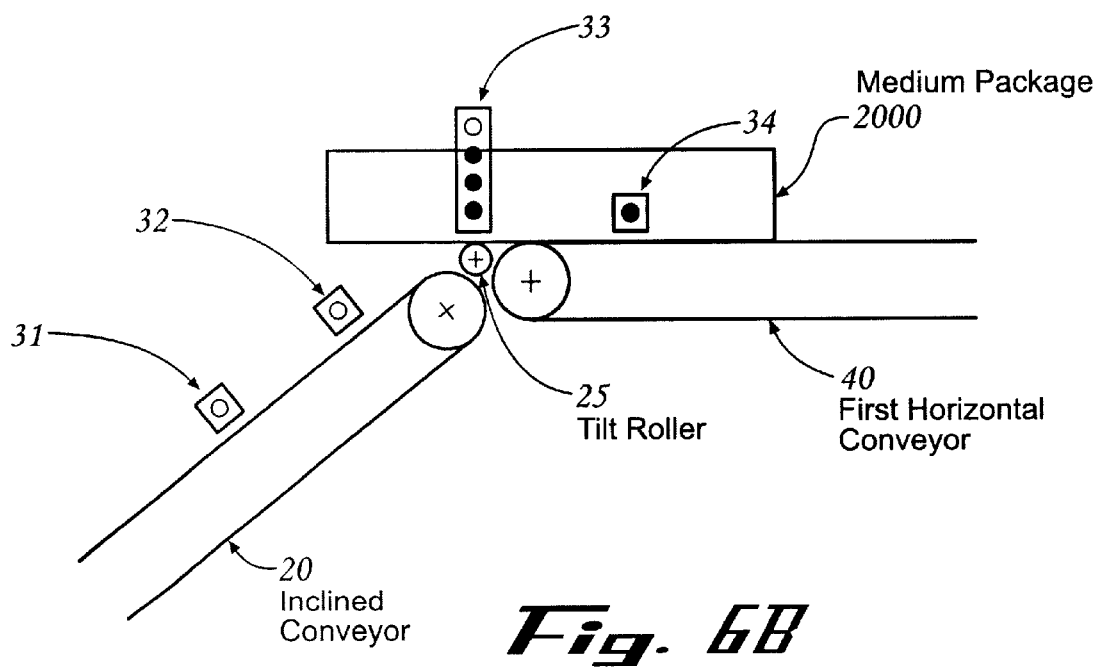

FIG. 6B is a view similar to FIG. 6A, except that the medium package 2000 has tilted and landed on the first horizontal conveyor 40. Sensors 31 and 32 are uncovered and sensor 34 is covered.

Figure 7A:
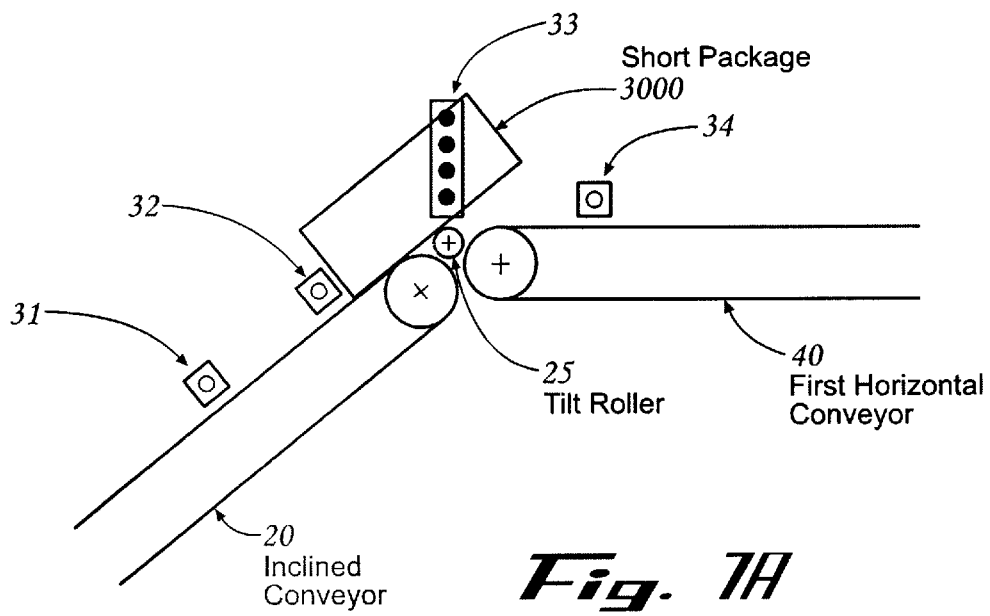

FIG. 7A is a side view similar to FIG. 3, except that a short package 3000 has entered the tilt sensor group 30 and has crossed the tilt roller 25 between the inclined conveyor 20 and the first horizontal conveyor 40. Sensors 31, 32, and 34 are all uncovered at this point in time, although sensor 33 is triggered.

Figure 7B:
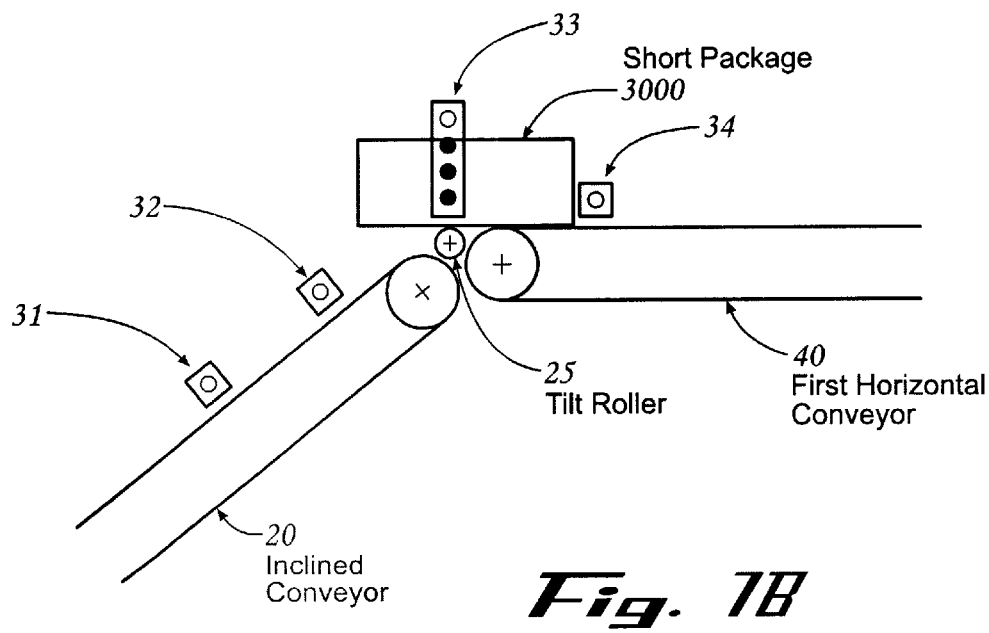

FIG. 7B is a view similar to FIG. 7A except the short package has tilted and landed on the first horizontal conveyor 40. Nevertheless, sensors 31, 32, and 34 are all uncovered at this point in time, although sensor 33 is triggered.

Figure 8A:
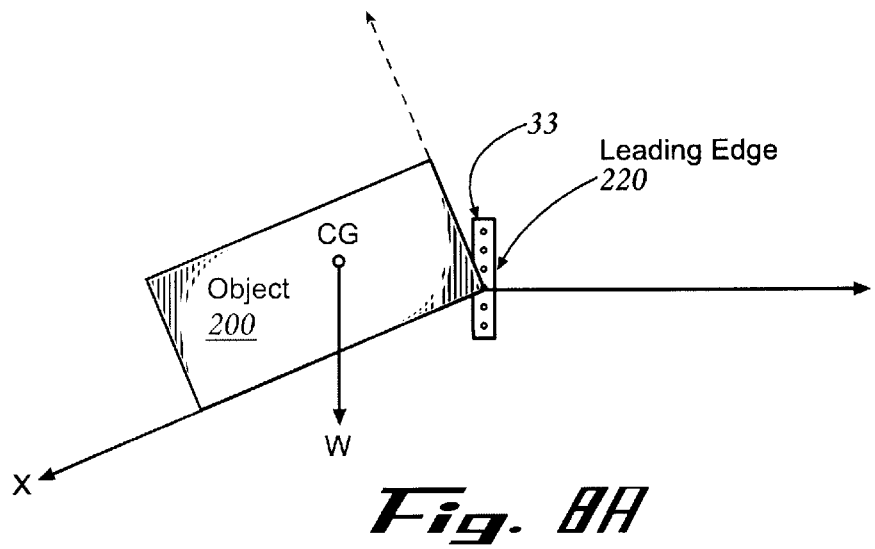
Figure 8B:
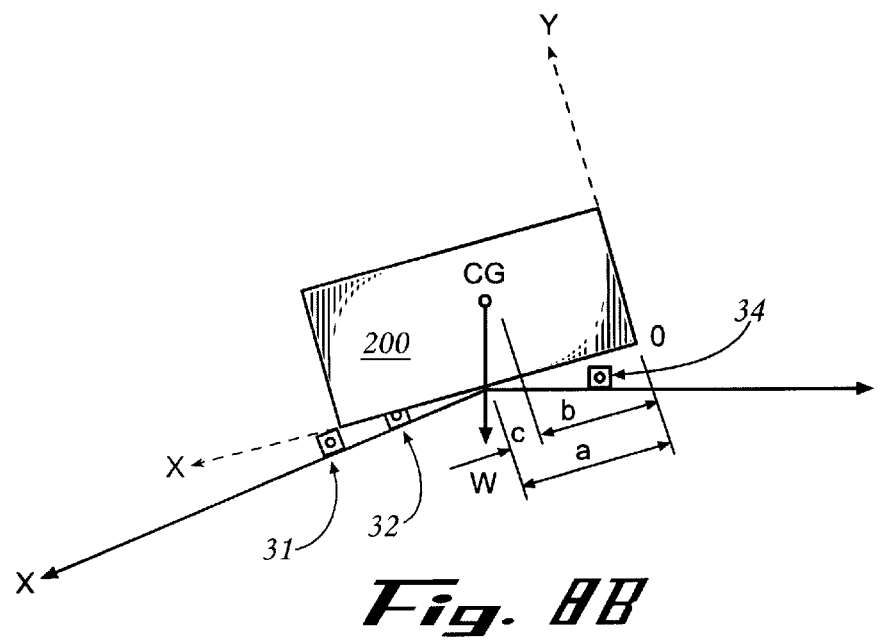

FIGS. 8A and 8B are illustrative diagrams of an object 200 in motion at different locations on an inclined plane and a horizontal plane, shown in progression to demonstrate a method of the present invention.

FIG. 8A is a block diagram of an object 200 at the moment its leading edge 220 reaches the crest between the inclined plane and the horizontal plane.

FIG. 8B is a block diagram of an object 200 in a relatively unstable position at the moment its center of gravity is positioned directly above the crest between the inclined plane and the horizontal plane.

Figure 9:
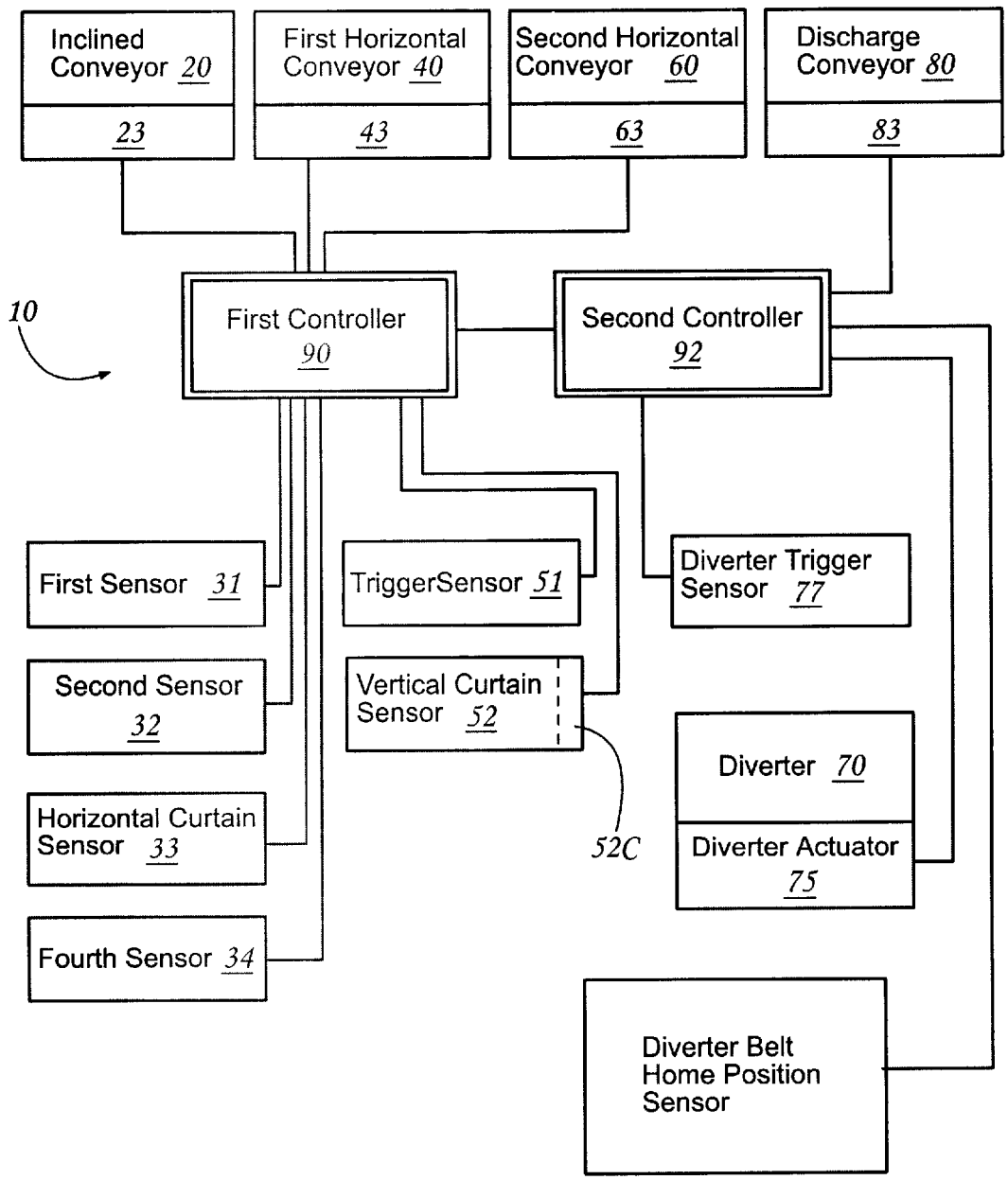

FIG. 9 is a block diagram of the control features of the system 10 of the present invention.

DETAILED DESCRIPTION OF THE DRAWINGS

Referring now in more detail to the drawings, in which like numerals indicate like elements throughout the several views, FIG. 1 is an illustration of the measuring and sorting apparatus 10 according to the present invention.

The conveying and diverting system (or apparatus) 10 includes the following elements and subelements:

inclined induction conveyor assembly 20
    inclined induction conveyor belt 21
angle 24
idling tilt roller 25
tilt sensor group 30
    first sensor 31
    second sensor 32
    third sensor 33
    fourth sensor 34
first horizontal conveyor assembly 40
    first horizontal conveyor assembly belt 41
width sensor group 50
    trigger sensor 51
    vertical curtain sensor 52
second horizontal conveyor assembly 60
    second horizontal conveyor assembly belt 61
diverter assembly 70
    diverter belt 71
    diverter cleat 72
actuator 75
    diverter trigger 77
discharge conveyor assembly 80
    discharge conveyor belt 81
discharge conveyor driving mechanism 83
collection area 100.

The following packages (a.k.a. parcels or items) are discussed by means of example:

object package 200
long package 1000
medium package 2000
short package 3000
flexible package 4000.

General Construction and Operation

Generally described, the apparatus 10 as shown in FIG. 1 includes an upwardly inclined induction conveyor 20 leading to a horizontal conveying assembly. The horizontal assembly may include a series of conveyors. In one preferred embodiment, the horizontal elements include a first horizontal conveyor 40, a second horizontal conveyor 60, and a third horizontal conveyor 80. An idling tilt roller 25 (a.k.a. "tilting roller") is positioned in a gap between the inclined conveyor 20 and the first horizontal conveyor 40. A group of sensors known as the tilt sensor group 30 is positioned proximate the tilt roller 25 to sense and transmit data about the object 200 being conveyed. Another group of sensors known as the width sensor group 50 is positioned near the gap between the first horizontal conveyor 40 and the second horizontal conveyor 60. A diverter 70 is positioned in the gap between the second horizontal conveyor 60 and the third horizontal conveyor 80.

In one aspect of the present invention, the diverter 70 is configured to divert an object 200 by contacting the object with a diverter cleat 71 (or another suitable diverting element) as the cleat moves towards the approximate center of gravity of the object 200. This center of gravity (a.k.a. "CG") is based upon object data gathered by the plurality of specifically placed upstream sensors. This approximated "CG" can be derived via actual measurement or by estimation.

The tilt sensor group 30 senses data about the object 200 (a.k.a. parcel, package, or item) as it passes over the tilt roller 25 including data relating to the size and relative rigidity of the object, as well as the CG of the object. The width sensor group 50 measures the width of the object 200, as well as its lateral location on the second horizontal conveyor 60.

The sensor data is transmitted to a signal processor 90 that, in turn, controls an actuator 75 to move the diverter 70 such that it pushes against the approximate center of gravity of the object 200, thereby diverting the object 200 off the conveyor with minimal rotation.

The Inclined Conveyor 20

The inclined conveyor assembly 20, as shown in FIG. 1, includes an endless conveyor belt 21 which is moved along an endless path around powered and idler rollers supported by a frame and driven by a motor or other suitable drive means (noted as 23 in FIG. 9) in a manner that is known in the art.

The supporting surface of the inclined conveyor belt 21 ramps upward at an angle 24. In one embodiment, the angle 24 may be ten degrees above horizontal, although other angles and inclined configurations are contemplated according to the present invention. The angle 24 shown in the figures may be exaggerated for clarity. This supporting surface could be considered to lie along a first supporting surface plane.

The inclined conveyor assembly 20 accepts parcels or other items from an outside source, such as by hand or from another conveyor, and delivers the parcels toward the idling tilt roller 25 and subsequently onto a first horizontal conveyor 40. In one embodiment, it is preferred that the parcels are placed "square" on the induction belt 21.

It should be understood that the belt conveyor system described above could be replaced with a powered roller or other suitable conveyor under an alternate version of the invention.

The Tilt Roller 25

At the discharge end of the inclined conveyor assembly 20 is located an idling tilt roller 25, which includes an elongate shaft mounted to the frame 11 of the apparatus 10 in a manner that allows rotational movement about the longitudinal axis of the tilt roller 25, caused by movement of the conveyed objects. This provides what shall be referred to in this application as a "rolling tilt", in that tilting is done as the tilted item rolls across a supporting member (in this case member 25). This roller 25 shall also be understood to provide a "crest", over which parcels tilt.

As noted above, the tilt roller 25 is in one embodiment an idling roller, in that it is not powered. Instead, it includes two opposing pins which extend in opposing directions and which function as stub shafts, in that they are free to rotate within upwardly-directed slots (not shown) defined by the frame of the apparatus. There are two such slots, one corresponding to each stub shaft, with each slot positioned on one side of the conveying path. This stub shaft/slot configuration allows the tilt roller 25 to be "dropped in" without the use of tools. The pins and slots could include suitable bearings or bearing material as needed.

It should also be understood that a powered roller could be used in place of an idling roller under an alternate invention.

The tilt roller 25 and the inclined conveyor could be considered to be part of a conveyor assembly also including conveyor assembly 20, as they convey parcels along a plane which could be considered a first supporting surface plane.

The tilt roller 25 could also be considered a "crest" over which relatively rigid parcels tilt over and away from the first conveyor 20 (flexible parcels will be discussed separately). Relatively rigid parcels passing over said crest portion tilt over said crest portion as a unit and away from said first conveyor. It may be seen that during the initial tilting the trailing portion of the parcel moves upwardly and away from the conveying surface; this is one way the system recognizes tilting is occurring, assuming other restrictions are met.

It should be understood that under an alternative configuration under the present invention, instead of using a tilting roller to provide said tilting, no tilting roller could be used, and the parcels could tilt off the end of the first conveyer 20 and the end of the conveyor 20 could be considered the "crest".

The First Horizontal Conveyor 40

The first horizontal conveyor assembly 40 includes an endless first conveyor belt 41 which is moved along an endless path around powered and idler rollers supported by a frame and driven by a motor (or other suitable drive means) (noted as 43 in FIG. 9) in a manner that is known in the art.

The first horizontal conveyor 40 moves objects 200 from the tilt roller 25 towards the width sensor group 50, and transfers such objects to the second horizontal conveyor 60.

It should be understood that the belt conveyor system described above could be replaced with a powered roller or other suitable conveyor under an alternate version of the invention.

It should also be understood that if no distinction is being made between an inclined conveyor and a horizontal conveyor, conveyor 20 could be considered a "first" conveyor and conveyor 40 could be considered a "second" conveyor.

The Second Horizontal Conveyor 60

Still referring to FIG. 1, the second horizontal conveyor 60 includes an endless second conveyor belt 61 which is moved along an endless path around powered and idler rollers supported by a frame and driven by a motor (or other suitable drive means) (noted as 63 in FIG. 9) in a manner that is known in the art.

The second horizontal conveyor 60 moves objects 200 from its entry end (proximate the width sensor group 50) towards its exit end, proximate the diverter assembly 70.

As an object 200 moves toward the end of the second horizontal conveyor 60, it passes a diverter trigger sensor 77 shown in FIG. 1 to alert the system 10 of the arrival of the object 200 at the diverter 70. Using the known velocity of the second horizontal conveyor 60, the system 10 of the present invention uses the activation of the diverter trigger sensor 77 to "double-check" the location of the object 200.

The Third Horizontal Conveyor 80

The third horizontal conveyor 80 includes an endless discharge conveyor belt 81 which is moved along an endless path around powered and idler rollers supported by a frame and driven by a motor (or other suitable means) (a.k.a. a "discharge conveyor driving mechanism 83") in a manner that is known in the art.

The third horizontal conveyor 80 accepts and conveys objects 200 that pass from the second horizontal conveyor 60 over the diverter 70 without being diverted.

It should be understood that the belt conveyor system described above could be replaced with a powered roller or other suitable conveyor under an alternate version of the invention.

Diverter 70

As shown in FIG. 1, the diverter assembly 70 of the present invention in one embodiment is positioned between the second horizontal conveyor 60 and the third horizontal conveyor 80. The diverter 70 may include an endless narrow diverter belt 71 which is moved along an endless path transverse to the moving direction of conveyors 60, 80, and driven by a servo driven actuator motor ("actuator 75") that controls the direction and velocity of the diverter belt 71.

In one preferred embodiment, the diverter 70 of the present invention uses a modified bilateral sorter similar to the type disclosed in commonly-owned U.S. Pat. No. 6,204,042, issued Jul. 24, 2001, which is incorporated herein by reference. The bilateral sorter may include an endless narrow belt having two spaced-apart sections where a series of cleats such as 72 are affixed to the narrow belt. The cleats are designed to carefully and gently push an object being diverted.

The narrow belt of the bilateral sorter has a home position and an edge or "ready" position. The edge position represents the location of the narrow belt such that the first of the cleats is positioned close to where the near side edge of the footprint of the object 200 will pass when it reaches the bilateral sorter 70. Based upon the known location of the near side edge, the actuator 75 places the narrow belt of the bilateral sorter 70 at the edge position, to pre-position the narrow belt and ready the system to divert the object 200. This diversion is accomplished by contact of the cleat(s) with the surface which extends upwardly from the near side edge.

It should be understood that the narrow belt 72 may be activated to push against the surface which extends upwardly from the near side edge or the surface which extends upwardly from the far side edge, depending upon the discharge side selected for the object 200. Alternatively, the narrow belt 72 may be directed to remain at the home position so as to allow the object 200 to proceed directly onto the third horizontal conveyor 80. In this manner, the diverter 70 and its controls determine in which of three possible directions the object 200 will be conveyed.

The home position represents the neutral position of the narrow belt 72, where the narrow belt 72 returns when not in active use. The narrow belt 72 in one preferred embodiment includes two cleated sections along its length and two uncleated sections spaced therebetween. Either uncleated section can be used as a home position. Including two cleated sections and two uncleated sections reduces by half the time it takes for the narrow belt 72 to move to one of the available home.

It should be understood that the ejection system described above could be replaced with an alternate ejection system under an alternate configuration of the invention.

Tilt Sensor Group 30

As shown in FIG. 3, the tilt sensor group 30 includes a first sensor 31, a second sensor 32, a horizontal curtain sensor 33, and a fourth sensor 34. In one preferred embodiment, these sensors are through-beam photoelectric sensors, although other sensor types are contemplated according to the present invention.

In one preferred embodiment, the tilt sensor group 30 is arrayed as shown in FIG. 3 such that the first and second sensors 31, 32 are positioned upstream from the tilt roller 25, and the fourth sensor 34 is positioned downstream from the tilt roller 25.

In one embodiment not that should be construed as limiting, the first sensor 31 is about 6.00 inches (15.24 cm) upstream from the vertical curtain sensor 33, the second sensor 32 is about 2.75 inches (6.99 cm) upstream from the vertical curtain sensor 33, and the fourth sensor 34 is about 3.00 inches (7.62 cm) downstream from the vertical curtain sensor 33.

The first sensor 31 could also be considered a "first tilt initiation sensor", as that is one of its functions. The second sensor 32 could likewise be considered a "second tilt initiation sensor". The fourth sensor 34 could likewise also be considered a "first tilt completion sensor". The operation and use of these sensors 31, 32, and 33 will be discussed in later detail. The horizontal curtain sensor 33 is mounted beside the tilt roller 25 with its sides in a substantially vertical orientation to measure the length of an object 200 as it passes. In one embodiment the light curtain 33 is a bank of aligned horizontal individual sensors, but they are configured with suitable controls to function as a single sensor. In other words, if any of the horizontal beams is broken, the sensor will be considered triggered.

The plane of the inclined conveyor passes above the lowest sensor in the light curtain and below the next-to-lowest sensor in the light curtain.

Width Sensor Group 50

Referring again to FIG. 1, as an object 200 moves along the first horizontal conveyor 40 toward the second horizontal conveyor 60, the object 200 passes by a trigger sensor 51 and then through a vertical curtain sensor, which may also be referenced as a profiling assembly 52. The profiling assembly 52, in one preferred configuration, may include an array of discrete photoelectric sensors which are used to determine the overall width of the object 200, and its lateral position on the conveyors 40, 60. As will become apparent, the lateral position is useful in determining the location of the near and far side edges of the object 200. The object 200 moves from the first horizontal conveyor 40 onto the second horizontal conveyor 60 as it passes through the profiling assembly 52 positioned between the two conveyors.

System Control

FIG. 9 is a functional block diagram of the controls of the system 10 of the present invention. In one preferred embodiment, the system 10 is controlled by a first controller 90 and a second controller 92. In general, the first controller 90 gathers information from the various sensors, while the second controller 92 sends information to the diverter actuator 75 and/or the discharge conveyor driving mechanism 83.

The curtain sensor 52 includes its own internal controller 52-C, which reports to the first controller.

In one aspect of the system 10 of the present invention, the inclined conveyor driving mechanism 23 drives the inclined conveyor 20 at a constant velocity, and provides a signal representative of such velocity to the first controller 90. Similarly, the first and second horizontal driving mechanisms 43, 63, respectively, drive the first and second horizontal conveyors 40, 60, respectively, at a constant velocity, and provide a signal representative of such velocities to the first controller 90. As may be understood, the conveyor velocity vx is an important variable used in estimating the CG location. Preferably these two conveyors run at the same speed.

The system 10 continuously monitors the conditions of the photoelectric sensors 31 through 36 and 77 to determine whether they are in a blocked or unobstructed condition.

General Function of Tilt Sensor Group

It should be understood that the tilt sensor group in conjunction with the present invention is capable of evaluating various physical characteristics of the conveyed objects. One feature of the invention allows for the determination of whether the parcel is relatively rigid or relatively flexible. If the parcel is determined to be relatively rigid, under another feature of the invention its length is evaluated to determine if the parcel is long, medium or short (in length). Depending on the determined length of these rigid packages, different types of CG determination or assignment rules may then be applied to these packages.

As noted above, the tilt sensor group 30 shown in FIG. 3 includes a first sensor 31, a second sensor 32, a third sensor 33 and a fourth sensor 34. These sensors may be used in conjunction with other sensors without departing from the spirit and scope of the present invention. As will be noted from discussion elsewhere, the first sensor 31 could also be considered a "first tilt initiation sensor", the second sensor 32 could be considered a "second tilt initiation sensor", and the fourth sensor 34 could likewise also be considered a "first tilt completion sensor".

It may be also be understood that if the first and second sensors both sense a particular parcel, these sensors will be sensing different, spaced apart, portions of the same parcel. Therefore it may be said that the first sensor will be sensing a first parcel portion and the second sensor will be sensing a second parcel portion. The same applies for the other sensors.

Flexibility Evaluation

Under one method according to the present invention, the tilt sensor group 30, in conjunction with other control elements, is used to determine if a parcel is "flexible" relative to a pre-established standard. This standard can vary from apparatus to apparatus, but generally speaking does not vary for a given apparatus assuming the position and sensitivity of the sensors is not changed.

As will be discussed in further detail below, the use of a tilting process in conjunction with tilting sensors is used for parcels which are rigid enough to "tilt" (or roll) over the idling tilt roller 25. However, the present invention also accommodates the use of "bags", which, unlike traditional rectangular parcels made of cardboard or the like, tend to be more flexible, and do not "tilt". Since such tilting cannot be provided, the system accommodates this by providing two sensors and suitable controls. Under one embodiment of the present invention this includes sensors 32 and 34, which as may be seen are on opposite sides of the idling tilt roller 25. The system will recognize that a flexible package is being processed when sensors 32 and 34 both recognize the presence of a package/parcel/item at the same time. As may be understood, when both such sensors recognize the presence of a parcel at the same time, the system according to the invention will assume that the parcel is "flexible" so as to bend over the idling tilt roller 25.

As shown in FIG. 4, an exemplary object shape is determined to be flexible if certain photoelectric beams emitted by sensors 32 and 34 are obstructed by the object at the same time. A flexible pouch 500 for example will obstruct the second sensor 32 and the fourth sensor 34 simultaneously (and if long enough may also obstruct sensor 31 as shown). Conversely, a rigid object such as a typical parallelepiped cardboard box will not obstruct sensors 32 and 34 at the same time when traveling over the tilt roller 25, because of the angle of inclination.

Once an item is assumed to be "flexible", it is assumed that it will not pivot. The method then assigns a predetermined estimated location to the CG along the length of the item. Under one embodiment of the present invention, this is assumed to be a percentage of the length of the item. In one particular embodiment of the present invention, this percentage is assumed to be 40%, in that a flexible parcel ten inches long will be assumed to have a CG located four inches from its leading edge. This is an empirically determined amount which can be varied as needed.

Package Size (Particularly Length) Evaluation

In another aspect of the invention, inflexible object size is determined to be long, medium, or short. Each size is treated differently in the determination (which includes assignment) of CG.

For a "long" package 1000, as depicted in FIGS. 5A and 5B, the photoelectric beams emitted by the first sensor 31 and the second sensor 32 will be uncovered at approximately the same time (or within a preselected time period which can be selected as desired by the programmer) when a suitably long package 1000 tilts over the tilt roller 25. Thus the system of the invention assumes that a parcel is long if the first and second sensors are uncovered (a.k.a. "untriggered") within a preselected time period. As may be understood this programmed period could be varied as needed, such as if different belt speeds are used, or if typical package characteristics are varied, and thus a particular time period cannot be stated as being preferred.

For a medium length package 2000, as depicted in FIGS. 6A and 6B, or for a short length package 3000 as shown in FIGS. 7A and 7B, the photoelectric beam emitted by the first sensor 31 will be uncovered (although not due to tilting) while the second sensor 32 remains obstructed.

In order to distinguish between a medium package 2000 and a short package 3000, the fourth sensor 34 is used in conjunction with system controls. Particularly, the timing of the uncovering of the second sensor 32 is compared to the timing of the covering of the fourth sensor 34. If these events both occur within a certain predetermined period of time (again which can vary depending on the system and can be selected during setup or programming of the system) the system assumes that the parcel has tilted from the position shown in FIG. 6A to the position shown in FIG. 6B and thus is a medium length package 2000. If instead these events do not occur within a certain period of time, then the scenario as shown in FIGS. 7A and 7B will have assumed to occur, resulting in a determination of a short package 3000.

It should be understood that the time periods discussed above can be different depending on the types of items which are being processed by the apparatus, depending on the speed at which the apparatus is operating, depending on the sensitivity of the sensors, depending on the desired definition of "long", "medium" or "short", or depending on a variety of other variables.

In this manner, the size of the object 200 is estimated by the three sensors 31, 32, 34, in conjunction with system controls, and the system assigns an object size of long package 1000, medium package 2000, or short package 3000.

Under one method of the present invention, the determination of a long package 1000, medium package 2000, or short package 3000 results in the assignment of a CG value by three different methods. This assignment can be by evaluation of the tilting characteristics or the packages or by assignment of CG by empirical methods, without evaluating tilting characteristics.

In the case of a short package, the CG is simply assigned to be in the middle of the package. Thus no tilting evaluation is made; the measured length of the package is all that is needed. This is done by the light curtain 33 in conjunction with the known belt speed. However, it should be understood that the horizontal light curtain 33 information is buffered so that it can be used in case a short package is processed (which the system wouldn't know until after the light curtain was broken).

In the case of medium and long packages, an estimation of the CG location is made as described in more detail below by "evaluating tilting"; in other words by sensing at what time the packages begin and complete their tilt over the idling tilt roller 25.

In the case of medium packages, sensor 32 will be used to sense the beginning of package tilt. In the case of long packages, sensor 31 will be used to sense the beginning of package tilt, although it may be understood that sensor 32 will also be uncovered at approximately the same time. This is recognized as one important invention in that it may be understood that the further the sensor is from the tilting location, the more accurate the measurement of tilting; thus the invention optimizes the use of the two sensors 31, 32. In both cases, the light curtain sensor 33 is used to determine how far the parcel has passed over the idling tilt roller 25 when they begin their tilt.

Therefore it may be seen that the invention allows for the use of the two first sensors 31 and 32 for tilting evaluation, but when possible, for purposes of accuracy, allows for the use of the furthest available upstream sensor being uncovered by tilting.

Center of Gravity Measurement, Tilting

One method of the present invention measures the approximate location of the center of gravity (CG) of an object 200 by evaluating its tilting characteristics over the idling tilt roller 25. Once the parcel has passed over the roller 25, it should be understood that a center of gravity component has been determined. This center of gravity component is only in one axis, which will be presumed for purposes of this discussion in the "x" axis, which will also be presumed for purposes of this discussion to be the axis along which the package is traveling from the beginning to the end of the overall conveyor system. Thus the center of gravity calculation will be presumed to be a certain distance from the leading edge of the parcel. This distance is determined from recognizing from at what point the package "tilts" after its leading edge has been passed over the pivoting roller.

As may be understood, an object 200 that is transported up the inclined conveyor 20 and onto the first horizontal conveyor 40 will start to tilt when its CG passes over the tilt roller 25 at the crest. The present invention uses a series of sensors to measure the distance between the leading edge 220 of an object 200 and the approximate longitudinal position of the CG. Using the approximate CG location, a diverter 70 positioned downstream from the sensors is actuated to push against the CG of the object 220.

FIGS. 8A and 8B are block diagrams that are useful in demonstrating the basic principle of the inventive method. The x-y axis is centered about the leading edge 220 of the object 200. The weight W of the object 200 is shown acting through the center of gravity (CG). The x-y axis is fixed with respect to the object 200 and, therefore, moves and rotates with the object 200 as it moves and rotates.

FIG. 8B shows the object 200 at the approximate moment when the CG is located directly above the crest between the inclined plane and the horizontal plane (the package will be assumed to have just begun its tilt). At this location, the distance b is the x-coordinate of the CG. The objective of the present invention is to calculate this distance b for the object 200.

Referring to the block diagrams in FIGS. 8A and 8B, the system of the present invention, in one aspect, uses the known speed vx of the conveyors and the various times at which certain sensors are tripped to measure data about each object 200. In one aspect of the present invention, the vertical curtain sensor 33 (shown in FIG. 8A) first senses the leading edge 220 of the object 200 at a time defined as T1. At the moment in time depicted in FIG. 8B, the object 200 has begun to tilt (clockwise) such that all three sensors 31, 32, 34 are unobstructed. This moment in time is defined as T2. The difference between T2 and T1 is used by the inventive method to calculate the distance b for the object 200 being measured. In one preferred embodiment, the time T1 is set to equal zero seconds such that the time T2 alone represents the time needed to calculate the distance b.

In a related aspect of the present invention, the method of calculating the distance b begins from the known laws of motion; specifically, distance equals velocity times time. Because of the angle of inclination and the fact that an object's weight W is always exerted vertically downward, the method of the present invention first calculates the distance a shown in FIG. 8B. Applying the laws of motion to the block diagram in FIG. 8B, and using the known speed vx of the conveyors, the distance a equals vx times the difference between T2 and T1.

$$a = vx*(T2-T1)$$

If T1 equals zero seconds, the distance a equals vx times T2.

It will be appreciated by those skilled in the art that there is a difference between the distance a and the distance b. The distance b is shorter than the distance a. In FIG. 8B, the difference between the distance a and the distance b is labeled as the distance c.

In one aspect of the present invention, it has been observed that the distance c varies depending upon the angle of inclination and the velocity vx of the conveyors. As the conveyor velocity vx increases, the distance c increases.

In a related aspect, the method of the present invention includes a distance known as a correction factor cf which has been determined experimentally using objects with known CG locations and known weights. The correction factor cf is a function of the conveyor velocity vx, the angle of inclination, and the weight W of the object 200. For example, for an angle of inclination of ten degrees and a conveyor velocity vx of 150 feet per minute (45.72 meters per minute), the correction factor cf is 1.00 inches (2.54 cm). At the same angle, for a conveyor velocity vx of 300 feet per minute (91.44 meters per minute), the correction factor cf is 2.50 inches (6.35 cm). For a conveyor velocity vx of 450 feet per minute (137.16 meters per minute), the correction factor cf is 4.00 inches (10.16 cm).

It has been observed that the correction factor cf is an approximation of the distance c that is sufficiently accurate to result in a reliable calculation of the distance b. Recalling from FIG. 8B that b equals a minus c, $$b=a-c$$

using the calculation set forth above for the distance a, $$b=[vx*(T2-T1)]-c$$

and using the correction factor cf in place of the distance c, $$b=[vx*(T2-T1)]-cf$$

the distance b, indicating the position of the CG of the object 200, can be calculated with sufficient accuracy. In one preferred embodiment where T1 equals zero seconds, the calculation becomes, $$b=[vx*T2]-cf$$

where T2 is measured by the sensors of the present invention, vx is the known conveyor velocity, and cf is the correction factor that corresponds to the angle of inclination and the known conveyor velocity.

Diverter 70 Pre-Positioning

In a further aspect of the system 10, the profiling assembly 50 is in communication with the first controller 90. The profiling assembly 50 senses both the overall width of the object 200 and the location of the near side edge of the object 200, which for purposes of this discussion will be assumed to be the side opposite the collection area 100 of FIG. 2. The profiling assembly 50 transmits a signal to the first controller 90 representative of such measurements.

The second controller 92, using data from the first controller 90, is configured to direct the diverter actuator 75 to pre-position the narrow belt 71 of the diverter 70. The pre-positioning task occurs when the object 200 is sensed by the diverter trigger sensor 77. The pre-positioning task moves the belt 71 from a home position to an edge position. The edge position represents the location of the narrow belt 71 such that the first of the cleats 71 is positioned close to where the near side edge of the object 200 will pass when it reaches the diverter 70. Based upon the known location of the near side edge, the actuator 75 places the narrow belt 71 of the diverter 70 at the edge position, to pre-position the narrow belt 71 and ready the system to divert the object 200 to the collection area 100.

Overall Process from Start to Finish

The overall process will now be restated in light of the above discussion of particular elements.

As noted above, the sorting of diverse packages requires a host of sensors and controllers to smoothly activate a variety of auxiliary devices positioned along the conveyor, such as the diverting mechanisms that move a selected package off a conveyor. Smooth diverter actuation requires extensive data about the parcel being diverted, especially when the diverter is called upon to move packages of different sizes, shapes, and weights.

A parcel is first placed on this inclined conveyor by hand or automation, and is introduced proximate the tilt sensor group 30.

The horizontal curtain sensor 33 of the tilt sensor group 30 transmits a signal to the first controller 90 when it senses the presence of a parcel at a time T1. T1 is preferably set to zero when the signal is received, such that receipt of the signal starts a timer running in a manner similar to a stopwatch. The other three sensors 31, 32, 34 also are used for sensing as discussed above.

The tilt sensor group 30 thus senses data about the parcel as it passes over the tilt roller 25 including data relating to the size and relative rigidity of the parcel, as well as the CG of the parcel. When the parcel has passed the tilt sensor group 30, all information needed to assign the center of gravity has been taken.

The width sensor group 50 then measures the width of the parcel, as well as its lateral location on the second horizontal conveyor 60. The parcel then approaches the diverter.

If the parcel is to be diverted sidewardly, sensor data is transmitted to a signal processor 90 that, in turn, controls an actuator 75 to move the diverter 70 such that the diverter 70 diverts the parcel by contacting the parcel with a diverter cleat 72 (or another suitable diverting element) as the cleat moves towards the approximate center of gravity of the parcel. This center of gravity (a.k.a. "CG") is based upon object data gathered by the plurality of specifically placed upstream sensors. This approximated "CG" can be derived via actual measurement or by estimation, as previously discussed. Preferably the cleat pushes against the approximate center of gravity of the parcel, thereby diverting the parcel off the conveyor with minimal rotation.

If the item is not to be diverted, the parcel passes over the diverter untouched.

Conclusion

While this invention has been described in specific detail with reference to the disclosed embodiments, it will be understood that many variations and modifications may be effected without departing from the spirit and scope of the invention as described in the appended claims.

What is claimed is:

1. A conveying apparatus for evaluating a plurality of parcels being conveyed thereon, said plurality of parcels having differing lengths, said plurality of parcels including a parcel, said apparatus comprising:

A) a first conveyor defining a first conveying surface and including an exit location; said first conveyor having a first conveyor portion which includes a crest located adjacent the exit location;

B) a first sensor configured for sensing the presence of a first parcel portion of said parcel while said parcel is on said conveying surface, said first sensor configured to provide a first sensor signal when said first parcel portion moves out of the sensing range of said first sensor due either to tilting of said parcel over said crest, or alternatively due to movement of said parcel along said first conveyor portion without tilting, said first sensor being a first distance from said exit location;

C) a second sensor configured for sensing the presence of a second parcel portion of said parcel while said parcel is on said conveying surface, said second sensor configured to provide a second sensor signal when said second parcel portion moves out of the sensing range of said second sensor due to tilting of said parcel over said crest, or alternatively due either to movement of said parcel along said first conveyor portion without tilting, said second sensor being a second distance from said exit location, said second distance being less than said first distance; and D) a signal processing device for receiving said first and second signals and for determining for each of said parcels if one of two conditions is met:

1) a first condition in which said first and second sensor signals are generated within a predetermined time;
2) a second condition in which said first and second sensor signals are not generated within said predetermined time, said signal processing device providing a different output regarding parcel length depending on whether said first or second condition is met; whereby a tilting evaluation is also based upon the determination of said first or second condition.

2. The apparatus as claimed in claim 1, wherein parcel length is estimated to be longer than a predetermined length if a parcel satisfies said first condition and parcel length is estimated to be shorter than a predetermined length if a parcel satisfies said second condition.

3. A conveying method of evaluating a plurality of parcels having different physical lengths, said method comprising the steps of:
   A) providing a conveyor having a conveying path which includes a crest portion over which said plurality of parcels may be individually tilted from a first, nontilted, position to a second, tilted, position while being conveyed along said path;
   B) providing a first sensor proximate said conveying path and positioned a first distance relative to said crest;
   C) providing a second sensor proximate said conveying path and positioned a second distance relative to said crest, said second distance being less than said first distance;
   D) conveying said plurality of parcels along said conveying path such that each parcel tilts over said crest;
   E) determining for each of the parcels if one of the following two conditions has been met:
      1) a first condition in which parcel tilting begins while said parcel is still being sensed by both said first and second sensors; or
      2) a second condition in which parcel tilting is done after said parcel has passed out of the range of said first sensor but while still being sensed by said second sensor,
   F) estimating parcel length for each of said parcels based on whether said parcel satisfies said first or said second condition.

4. The method as claimed in claim 3, wherein parcel length is estimated to be longer than a given predetermined length if a parcel satisfies said first condition and wherein parcel length is estimated to be shorter than a given predetermined length if a parcel satisfies said second condition.

5. A conveying apparatus for evaluating a plurality of parcels being conveyed along a conveying path, said plurality of parcels having differing lengths, but each including a first and a second parcel portion said conveying apparatus particularly configured to evaluate tilting characteristics of said parcels as they are conveyed along said conveying path, said conveying apparatus comprising:
   A) a conveyor assembly itself including:
      1) a first conveyor portion along said conveying path for conveying parcels thereon without tilting; and
      2) a crest portion along said conveying path and positioned proximate the end of said first conveyor portion, said crest portion configured such that parcels passing over said crest portion tilt over said crest portion and away from said first conveyor portion;
   B) a first sensor positioned a first distance from said crest and having a sensing range, said first sensor configured to provide a first sensor signal when a first parcel portion of a given parcel moves out of said sensing range of said first sensor due either to tilting of said parcel over said crest, or alternatively due to movement of said parcel along said first conveyor portion without tilting;
   C) a second sensor positioned a second distance from said crest said second distance less than said first distance, said second sensor having a sensing range and configured to provide a second sensor signal when a second parcel portion of a given parcel moves out of said sensing range of said second sensor due either to tilting of said parcel over said crest, or alternately due to movement of said parcel along said first conveyor portion without tilting; and
   D) a signal processing device for receiving said first and second sensor signals and for determining if one of the following two conditions is met for a given parcel:
      1) a first condition in which said first and second sensor signals are generated within a predetermined time period, upon which said signal processing device assumes said parcel is tilting out of the range of both said first and second sensors at the same time; or
      2) a second condition in which said first and second signals are not generated within a predetermined time period, whereupon said signal processing device assumes said parcel has passed said first sensor and is only tilting out of the range of said second sensor,
   said signal processing device further making a tilting evaluation based upon the determination of said first or second condition, said tilting evaluation for purposes of accuracy using said first sensor signal under said first condition, and said tilting evaluation using said second signal under said second condition.

6. The conveying apparatus as claimed in claim 5, further comprising means for providing a signal to said signal processing means corresponding to the distance said parcel has passed over said crest at the point said parcel begins tilting, for purposes of gravity center estimation.

7. The conveying apparatus as claimed in claim 6, wherein a curtain sensor is used to sense when said parcel has passed over said crest.

8. The conveying apparatus as claimed in claim 5, wherein said first conveyor portion is a belt conveyor, and wherein said crest portion is a tilting roller.

9. The conveying apparatus as claimed in claim 5, wherein said first conveyor portion is a belt conveyor, and wherein said crest portion is the downstream end of said belt conveyor.

10. A method for evaluating the tilting characteristics of parcels being conveyed along a conveying path, said parcels having different lengths, said method comprising the steps of:
   A) providing a conveyor assembly itself comprising:
      1) a first conveyor portion along said conveying path for conveying parcels thereon without tilting; and
      2) a crest portion along said conveying path and positioned proximate the end of said first conveyor portion, said crest portion configured such that parcels passing over said crest portion tilt over said crest portion and away from said first conveyor portion;
   B) placing a first sensor a first distance from said crest, said first sensor having a sensing range and configured to provide a first sensor signal when a first parcel portion of a given parcel moves out of the sensing range of said first sensor due either to tilting of said parcel over said crest, or alternately due to movement of said parcel along said first conveyor portion without tilting;

C) placing a second sensor a second distance from said crest, said second distance being less than said first distance, said second sensor having a sensing range and configured to provide a second sensor signal when a second parcel portion of a given parcel moves out of the sensing range of said second sensor due either to tilting of said parcel over said crest, or alternately due to movement of said parcel along said first conveyor portion without tilting;

D) determining if either of the following conditions are met for a given parcel:
1) a first condition in which parcel tilting begins while said parcel is still being sensed by both said first and second sensors; or
2) a second condition in which parcel tilting begins after said parcel has passed said first sensor and is out of the range of said first sensor, but said parcel is still being sensed by said second sensor; and E) performing a tilting evaluation based upon the determination of said first or second condition, said tilting evaluation for purposes of accuracy using said first sensor signal under said first condition, and said tilting evaluation using said second signal under said second condition.

11. A method of evaluating the physical characteristics of parcels being conveyed along a conveying path, said method comprising the steps of:
A) defining a flexibility standard distinguishing more flexible parcels from less flexible parcels;
B) positioning a plurality of sensors proximate a portion of said conveying path, said sensors positioned such that if they can all sense a portion of a given parcel at the same time said parcel passes along said conveying path portion, said parcel is considered more flexible under said flexibility standard, but if all said sensors cannot sense a portion of a given parcel at the same time said parcel passes along said conveying path portion, said parcel is considered less flexible under said flexibility standard;
C) conveying a parcel along said conveying path portion while sensing said parcel with said plurality of sensors; and
D) based upon the sensation of said parcel by said sensors in step "C", making a determination of whether said parcel is more flexible or less flexible under said flexibility standard.

12. The method as claimed in claim 11, wherein in step "B", a crest is included along said conveying path portion, said crest causing inflexible parcels to tilt, while flexible parcels flex over said crest and wherein at least one of said plurality of sensors is positioned on one side of said crest.

13. A method of evaluating the flexibility of each of a plurality of parcels being conveyed along a conveying path, said plurality of parcels including more flexible and less flexible parcels being correspondingly more and less flexible than a predetermined parcel flexibility, said method comprising the steps of:
A) providing a first conveyor assembly along said conveying path, said first conveyor assembly defining a first supporting surface plane and including a crest at its downstream end along said conveying path;
B) providing a second conveyor assembly along said conveying path and downstream of said first conveyor assembly to allow passage of parcels from said first to said second conveyor assembly, said second conveyor assembly defining a second supporting surface plane being at an angle relative to said first supporting surface plane such that less flexible parcels tend to tilt as a unit but not to deform when passed from said first conveyor assembly to said second conveyor assembly, but such that more flexible parcels tend not to tilt as a unit but to deform over said crest when passed from said first conveyor to said second conveyor;

C) positioning a first sensor proximate said first supporting surface plane and positioning a second sensor on the opposite side of said crest and proximate said second supporting surface plane, said sensors being positioned such that a more flexible parcel of sufficient length will flex while passing over said crest and trigger both sensors, whereas a less flexible parcel will trigger only one sensor at a time while passing along said conveying path; and D) conveying parcels along said conveying path and making distinctions between more flexible and less flexible parcels based on the output of said first and second sensors.

14. The method of claim 13, wherein said distinction in Step D comprises assignment of a predetermined gravity center location if a more flexible parcel is recognized.

15. The method of claim 13, wherein Step A includes providing said first conveying assembly with a tilting roller to form said crest.

16. A conveying apparatus for evaluating the flexibility of each of a plurality of parcels being conveyed along a conveying path, said plurality of parcels including more flexible and less flexible parcels being correspondingly more and less flexible than a predetermined parcel flexibility, said apparatus comprising:
A) a first conveyor assembly along said conveying path, said first conveyor assembly defining a first supporting surface plane and including a crest at its downstream end along said conveying path;
B) a second conveyor assembly along said conveying path and downstream of said first conveyor assembly to allow passage of parcels from said first to said second conveyor assembly, said second conveyor assembly defining a second supporting surface plane being at an angle relative to said first supporting surface plane such that less flexible parcels tend to tilt as a unit but not to deform when passed from said first conveyor assembly to said second conveyor assembly, but such that more flexible parcels tend not to tilt as a unit but to deform over said crest when passed from said first conveyor to said second conveyor;
C) a pair of sensors, comprising a first sensor proximate said first supporting surface plane and a second sensor on the opposite side of said crest and proximate said second supporting surface plane, said sensors being positioned such that a more flexible parcel of sufficient length will flex while passing over said crest and trigger both sensors, whereas a less flexible parcel will trigger only one sensor at a time while passing along said conveying path; and
D) a processing device for making distinctions between more flexible and less flexible parcels based on the output of said first and second sensors while said parcels are being conveyed along said path.

17. A method of conveying and evaluating a plurality of parcels having different physical characteristics, said plurality of parcels including more and less flexible parcels being correspondingly more and less flexible than a predetermined parcel flexibility, said method comprising the steps of:

- making a determination that each of said parcels is a more or a less flexible parcel;
- assigning a gravity center characteristic to each of said parcels according to a first or a second criteria, depending on whether said parcel is observed to be more or less flexible, respectively, such that a more flexible parcel is assigned a gravity center characteristic according to a first criteria, and such that a less flexible parcel is assigned a gravity center characteristic according to a second criteria;
- conveying said plurality of parcels along a conveying path; and
- ejecting all of said parcels from said conveying path, with consideration given to the assigned gravity center characteristic when determining where to contact said parcels for ejection thereof.

18. The method as claimed in claim 17, wherein said first criteria assigned to said more flexible parcels relates to a predetermined, constant gravity center characteristic.

19. The method as claimed in claim 17, wherein said second criteria assigned to said more flexible parcels relates to the use of a measured gravity center characteristic.

20. The method as claimed in claim 17, wherein said first criteria assigned to said more flexible parcels relates to the use of a predetermined, constant gravity center characteristic in that the gravity center is assumed to be located at a distance from the leading edge of the parcel which is 40 percent of the total parcel length.

21. A method of conveying and evaluating a plurality of parcels having different physical characteristics, said plurality of parcels including shorter and longer parcels being correspondingly shorter and longer than a predetermined length, said method comprising the steps of:

- making a determination that each of said parcels is a longer or a shorter parcel;
- assigning a gravity center characteristic to each of said parcels according to a first or a second criteria, depending on whether said parcel is observed to be shorter or longer, respectively, such that a longer parcel is assigned a gravity center characteristic according to a first criteria, and such that a shorter parcel is assigned a gravity center characteristic according to a second criteria;
- ejecting all of said parcels from said conveying path, with consideration given to the assigned gravity center when determining where to contact said parcels for ejection thereof.

22. A conveying apparatus for evaluating the tilting characteristics of a parcel as it is conveyed along a conveying path, said apparatus comprising:

- a first conveyor including an exit end, said first conveyor configured to convey parcels off of said first conveyor at a location proximate said exit end;
- a second conveyor including an inlet end, said second conveyor configured to accept parcels onto said second conveyor at a location proximate said inlet end, said inlet end of said second conveyor and said first conveyor defining a gap therebetween;
- a tilt roller positioned within said gap, said tilting roller configured such that said parcel rolls over and tilts over said tilting roller as said parcel is conveyed from said first conveyor towards said second conveyor, with said parcel tilting from a position in contact with said first conveyor and said tilting roller to a position in contact with said second conveyor and said tilting roller; and
- at least one sensor to sense the tilting of said parcel as said parcel tilts over said tilting roller.

23. The conveying apparatus as claimed in claim 22, wherein said tilting roller is an idler roller.

* * * * *